(12) United States Patent
Berthelot et al.

(10) Patent No.: US 11,869,170 B2
(45) Date of Patent: Jan. 9, 2024

(54) GENERATING SUPER-RESOLUTION IMAGES USING NEURAL NETWORKS

(71) Applicant: Google LLC, Mountain View, CA (US)

(72) Inventors: David Berthelot, Mountain View, CA (US); Ian Goodfellow, Mountain View, CA (US)

(73) Assignee: Google LLC, Mountain View, CA (US)

(*) Notice: Subject to any disclaimer, the term of this patent is extended or adjusted under 35 U.S.C. 154(b) by 292 days.

(21) Appl. No.: 17/293,754

(22) PCT Filed: Nov. 18, 2019

(86) PCT No.: PCT/US2019/062041
§ 371 (c)(1),
(2) Date: May 13, 2021

(87) PCT Pub. No.: WO2020/102812
PCT Pub. Date: May 22, 2020

(65) Prior Publication Data
US 2021/0407042 A1    Dec. 30, 2021

Related U.S. Application Data

(60) Provisional application No. 62/768,801, filed on Nov. 16, 2018.

(51) Int. Cl.
*G06T 3/40* (2006.01)
*G06N 3/08* (2023.01)
(Continued)

(52) U.S. Cl.
CPC .......... *G06T 3/4046* (2013.01); *G06F 18/22* (2023.01); *G06N 3/045* (2023.01); *G06N 3/08* (2013.01); *G06T 3/4053* (2013.01); *G06T 5/50* (2013.01)

(58) Field of Classification Search
None
See application file for complete search history.

(56) References Cited

U.S. PATENT DOCUMENTS 10,169,852 B1 * 1/2019 Putman .............. G06F 18/2413
2020/0349393 A1 * 11/2020 Zhong .................... G06N 3/084

FOREIGN PATENT DOCUMENTS

| CN | 111861878 A | * 10/2020 | ........... G06K 9/6262 |
| CN | 111899163 A | * 11/2020 | ........... G06K 9/6228 |
| CN | 112492313 A | * 3/2021 | ........... G06T 3/4046 |

OTHER PUBLICATIONS

Kai Xuan, Liping Si, Lichi Zhang, Zhong Xue, Yining Jiao, Weiwu Yao, Dinggang Shen, Dijia Wu, Qian Wang, "Reducing Magnetic Resonance Image Spacing by Learning Without Ground-Truth", https://doi.org/10.48550/arXiv.2003.12627, March (Year: 2020).*

(Continued)

*Primary Examiner* — Jiangeng Sun
(74) *Attorney, Agent, or Firm* — Fish & Richardson P.C.

(57) ABSTRACT

Methods, systems, and apparatus, including computer programs encoded on computer storage media, for training a neural network. One of the methods includes receiving a training image and a ground truth super-resolution image; processing a first training network input comprising the training image using the neural network to generate a first training super-resolution image; processing a first critic input generated from (i) the training image and (ii) the ground truth super-resolution image using a critic neural network to map the first critic input to a latent representation; processing a second critic input generated from (i) the training image and (ii) the first training super-resolution image using the critic neural network to map the second critic input to a latent representation; determining a gradient of a generator loss function that measures a distance (Continued)

between the latent representations of the critic inputs; and determining an update to the parameters.

20 Claims, 4 Drawing Sheets

(51) Int. Cl.
    *G06T 5/50*     (2006.01)
    *G06F 18/22*     (2023.01)
    *G06N 3/045*     (2023.01)

(56) References Cited

OTHER PUBLICATIONS

A. Oluwasanmi, M. U. Aftab, A. Shokanbi, J. Jackson, B. Kumeda and Z. Qin, "Attentively Conditioned Generative Adversarial Network for Semantic Segmentation," in IEEE Access, vol. 8, p. 31733-31741, 2020, doi: 10.1109/ACCESS.2020.2973296.*

Arjovsky et al., "Wasserstein generative adversarial networks," International Conference on Machine Learning, Jul. 2017, 10 pages.

Blau et al., "The 2018 pirm challenge on perceptual image super-resolution," Proceedings of the European Conference on Computer Vision (ECCV) Workshops, 2018, 22 pages.

Blau et al., "The perception-distortion tradeoff," Proceedings of the IEEE Conference on Computer Vision and Pattern Recognition, 2018, 10 pages.

Bulat et al., "To learn image super-resolution, use a gan to learn how to do image degradation first," Proceedings of the European Conference on Computer Vision (ECCV), 2018, 16 pages.

Dahl et al., "Pixel recursive super resolution," Proceedings of the IEEE International Conference on Computer Vision, 2017, 10 pages.

Gatys et al., "Texture synthesis using convolutional neural networks," Centre for Integrative Neuroscience, University of Tubingen, Germany, arXiv preprint arXiv:1505.07376, May 2015, 10 pages.

Goodfellow et al., "Generative adversarial networks," Machine Learning, Cornell University, arXiv preprint arXiv:1406.2661, Jun. 2014, 9 pages.

Gulrajani et al., "Improved training of wasserstein gans," Montreal Institute for Learning Algorithms, arXiv preprint arXiv: 1704. 00028, Mar. 2017, 20 pages.

Hinton et al., "Neural networks for machine learning," Presented in Coursera Online Lecture, 2012, 48 pages.

Johnson et al., "Perceptual losses for real-time style transfer and super-resolution," European Conference on Computer Vision, Oct. 2016, 18 pages.

Jolicoeur-Martineau et al., "The relativistic discriminator: a key element missing from standard GAN," Lady Davis Institute, arXiv preprint arXiv: 1807.00734, Jul. 2018, 25 pages.

Karras et al., "Progressive growing of gans for improved quality, stability, and variation," Published as a Conference Paper at ICLR, arXiv preprint arXiv: 1710.10196, Oct. 2017, 26 pages.

Krizhevsky et al., "Learning multiple layers of features from tiny images," Technical Report, Apr. 2009, 60 pages.

Ledig et al., "Photo-realistic single image super-resolution using a generative adversarial network," Proceedings of the IEEE conference on computer vision and pattern recognition, 2017, 10 pages.

Lim et al., "Enhanced deep residual networks for single image super-resolution," Proceedings of the IEEE Conference on Computer Vision and Pattern Recognition Workshops, 2017, 9 pages.

Liu et al., "Deep learning face attributes in the wild," Proceedings of the IEEE International Conference on Computer Vision, 2015, 9 pages.

Lyu et al., "Motion-blind blur removal for CT images with Wasserstein generative adversarial networks," 2018 11th International Congress on Image and Signal Processing, BioMedical Engineering and Informatics, Oct. 2018, 5 pages.

Ma et al., "Learning a no-reference quality metric for single-image super-resolution," Computer Vision and Image Understanding, May 2017, 32 pages.

Mirza et al., "Conditional generative adversarial nets," Machine Learning, Cornell University, arXiv preprint arXiv:1411.1784, Nov. 2014, 7 pages.

Miyato et al., "cGANs with projection discriminator," Machine Learning, Cornell University, arXiv preprint arXiv:1802.05637, Feb. 2018, 21 pages.

Netzer et al., "Reading digits in natural images with unsupervised feature learning," Google Inc., 2011, 9 pages.

Parmar et al., "Image transformer," Proceedings of the 35 th International Conference on Machine Learning, arXiv preprint arXiv: 1802.05751, 2018, 10 pages.

PCT International Preliminary Report on Patentability in International Appln. No. PCT/US2019/062041, dated May 27, 2021, 1 pages.

PCT International Search Report and Written Opinion in International Appln. No. PCT/US2019/062041, dated Feb. 20, 2020, 10 pages.

Russakovsky et al., "Imagenet large scale visual recognition challenge," International Journal of Computer Vision, Jan. 2015, 43 pages.

Sajjadi et al., "Enhancenet: Single image super-resolution through automated texture synthesis," Computer Vision (ICCV), 2017 IEEE International Conference, 2017, 10 pages.

Talebi et al., "Nima: Neural image assessment," IEEE Transactions on Image Processing, Apr. 2018, 15 pages.

Tong et al., "Image super-resolution using dense skip connections," In Computer Vision (ICCV), 2017 IEEE International Conference, 2017, 9 pages.

Wang et al., "A fully progressive approach to single-image super-resolution," Computer Vision Foundation, arXiv preprint arXiv:1804. 02900, 2018, 10 pages.

Wang et al., "Esrgan: Enhanced super-resolution generative adversarial networks," Computer Vision Foundation, arXiv preprint arXiv:1809. 00219, 2018, 16 pages.

Wang et al., "Image quality assessment: from error visibility to structural similarity," IEEE Transactions on Image Processing, Apr. 2004, 14 pages.

Yu et al., "Lsun: Construction of a large-scale image dataset using deep learning with humans in the loop," Princeton University, arXiv preprint arXiv: 1506.03365, 2015 9 pages.

* cited by examiner

GENERATING SUPER-RESOLUTION IMAGES USING NEURAL NETWORKS

CROSS-REFERENCE TO RELATED APPLICATION

This application is a national phase entry under 35 U.S.C. 371 of PCT Application Serial No. PCT/US2019/062041, filed Nov. 18, 2019, which claims priority to U.S. Patent Application No. 62/768,801, filed on Nov. 16, 2018. The entirety of each of the foregoing is incorporated by reference.

BACKGROUND

This specification relates to processing images using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system that trains a super-resolution neural network having a plurality of super-resolution parameters. The super-resolution neural network is configured to receive a network input that includes an input image having a first resolution and to process the network input to generate a super-resolution output image that is a version of the input image with a second, higher resolution. Generally, the network input also includes a vector that represents a desired location in a space of possible super-resolution output images, i.e., a point in a space that represents all possible plausible super-resolution versions of the input image, of the super-resolution image that should be generated by the neural network.

Particular embodiments of the subject matter described in this specification can be implemented so as to realize one or more of the following advantages.

Conventional techniques for generating higher-resolution versions of input images can only generate plausible output images for low scaling factors, i.e., can only increase the resolution by a small factor, e.g., by 2× or 4×. Additionally, these conventional techniques often require using difficult to tune weighting hyper-parameters during the training of the neural network used to generate the output images. That is, these techniques use a loss that is a combination of several different terms, with each having a respective weight. The performance of the trained neural network is very sensitive to the weights chosen for all of the different terms and "tuning" these weights to find a high-performing combination is difficult and computationally intensive. The described techniques, on the other hand, train in a learned perceptual latent space which does not require additional losses such as pixel or content losses, thereby eliminating the need to tune weights for a large number of loss function terms. This allows for high quality and plausible output images to be generated at higher scaling factors while achieving a good balance between pixel and perceptual accuracy.

Moreover, existing techniques assume that there is only a single plausible super-resolution image that should be generated from a given input image. The described techniques, on the other hand, allow a variety of alternate super-resolution images to be explored that are each plausible but that extrapolate the missing content in the low-resolution image differently. This allows the trained neural network to learn to generate high quality, plausible and visually similar images. Additionally, the trained neural network could be used to generate multiple different but still plausible images from the same low-resolution image.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a training system that trains a super-resolution neural network having a plurality of super-resolution parameters. The super-resolution neural network is configured to receive a network input that includes an input image having a first resolution and to process the network input to generate a super-resolution output image that is a version of the input image with a second, higher resolution. In other words, the super-resolution neural network predicts a high resolution output image from a low resolution input image, with the high resolution output image being a prediction of what the low resolution input image would look like if it had the second, higher resolution. For example, the input image may be a 4×4, 8×8, or 16×16 image, and the output image can be a 128×128 image. More generally, depending on the configuration of the neural network, the neural network can upscale input images by a large scaling factor, e.g., 8×, 16×, or even 32×.

Figure 1:
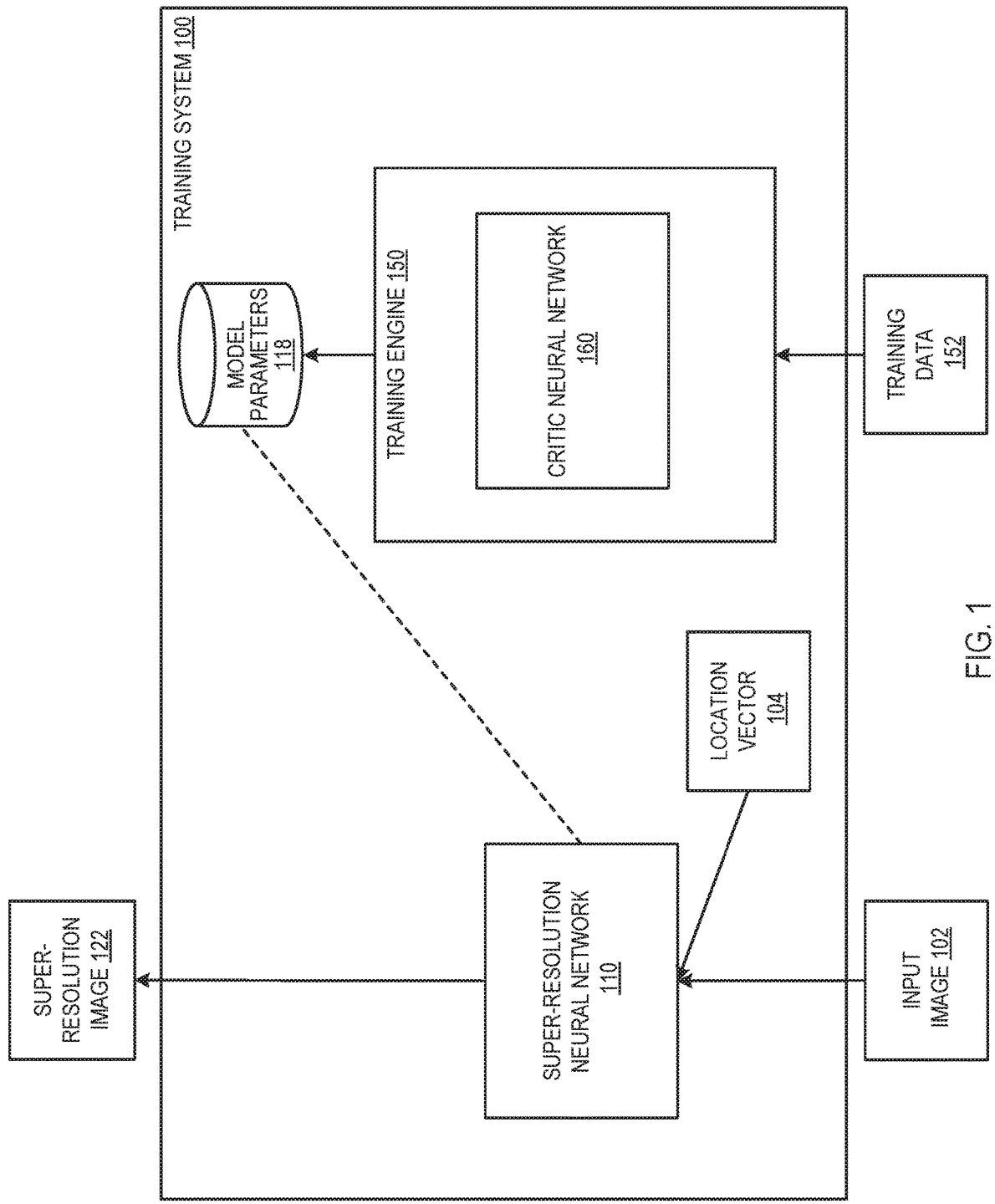
FIG. 1 shows an example training system.

FIG. 1 shows an example training system 100. The training system 100 is an example of a system implemented as computer programs on one or more computers in one or more locations in which the systems, components, and techniques described below are implemented.

The system 100 includes a super-resolution neural network 110, a training engine 150, and one or more memories storing a set of model parameters 118 of the super-resolution neural network 110. The parameters of the super-resolution neural network 110 will be referred to in this specification as "super-resolution parameters."

The super-resolution neural network 110 is configured to receive a network input that includes an input image 102 having a first resolution and to process the network input to generate a super-resolution output image 122 that is a version of the input image 102 with a second, higher resolution. In other words, the output image 122 is a prediction of what the input image 102 would look like if the input image 102 had the second, higher resolution.

Generally, the network input also includes a vector 104 that represents a desired location in a space of possible super-resolution output images, i.e., a point in a space that represents all possible plausible super-resolution versions of the input image 102, of the super-resolution image that should be generated by the neural network 110. In particular, because generating the super-resolution image 122 requires adding information to the input image 102, multiple different images having the second representations may be plausible high resolution representations of the input image 102, i.e., can fill in the missing information in different but still plausible ways. The values in the vector 104 therefore represent the desired location in the space of possible super-resolution output images. Generating the vector 104 will be described in more detail below.

The super-resolution neural network 110 can have any appropriate neural network architecture that allows the neural network 110 to map network inputs to images having the second resolution. As a particular example, the super-resolution neural network 110 can be a convolutional neural network, with or without residual connections, that repeatedly increases the spatial dimensionality, i.e., the resolution, of the input 102 until an image having the second resolution is generated.

To allow the neural network 110 to generate high quality output images, the training engine 150 trains the neural network 110 on a set of training data 152 to determine trained values of the model parameters 118.

The training data 152 includes multiple training examples, with each training example including a training input image and a ground truth super-resolution output image for the training image.

The training input image is an image that has the first resolution and the ground truth super-resolution output image for the training input image is an image that has the second resolution and has been classified as a plausible or actual super-resolution version of the training input image.

In particular, the training engine 150 trains the neural network 110 jointly with a critic neural network 160.

The critic neural network 160 is configured to receive a critic input generated from (i) an image having the first resolution and (ii) an image having the second resolution and to process the critic input in accordance with the parameters of the critic neural network 160 (referred to as "critic parameters") to map the critic input to a latent representation of the critic input in a perceptual latent space and to generate, from the latent representation of the critic input, a critic score that represents a perceptual similarity between the two images used to generate the critic input.

The latent representation is an ordered collection of numeric values, e.g., a vector of numeric values, in a latent space, i.e., a space having a fixed dimensionality. The latent space is referred to as a perceptual latent space because, during the training, the critic neural network 160 is trained such that positions of latent representations in the latent space reflect similarities and differences in perceptual characteristics of the two images from which any given critic input was generated. A perceptual characteristic is one that can be observed from viewing an image.

In some cases, the critic input is a combination, e.g., a concatenation, of (i) a low-resolution image having the first resolution and (ii) a super-resolution image having the second resolution.

In other cases, however, the system instead generates the critic input as a combination of (i) the super-resolution image having the second resolution and, in place of the low-resolution image, an absolute pixel-wise distance between (i) the low-resolution image and (ii) a downscaled version of the super-resolution image, i.e., the super-resolution image after it has been downscaled to have the same resolution as the low-resolution image. By allowing the critic neural network 160 to operate on the absolute pixel-wise distance instead of the low-resolution image directly, the critic neural network 160 may be able to more readily discern perceptual differences and similarities between the low-resolution image and the super-resolution image.

The critic neural network 160 can have any appropriate architecture that allows the critic neural network 160 to first map the critic input to a latent representation and then map the latent representation to a critic score. As a particular example, the critic neural network 160 can include a convolutional neural network that maps the critic input to the latent representation, i.e., as the output of the final layer in the convolutional neural network, and a multi-layer perceptron (MLP) that maps the latent representation to the critic score. More specifically, the critic neural network 160 can first apply one or more initial layers, e.g., convolutional layers and, optionally, one or more pooling layers, to the high-resolution image in the critic input that reduce the spatial dimensionality of the higher resolution image to match the spatial dimensions of the lower resolution image. The critic neural network 160 can then concatenate the reduced higher resolution image and the lower resolution image along the depth dimension and then process the concatenation through the remaining layers in the convolutional neural network to generate the latent representation.

After the neural network 110 has been trained, the system 100 can use the trained neural network 110 to generate super-resolution images from received input images. For example, the system 100 can receive requests that include an input image through an application programming interface (API) and provide super-resolution versions of the input images in response to the requests. Alternatively or in addition, the system 100 can provide the trained values of the super-resolution parameters to a user or to another system for use in instantiating a trained version of the super-resolution neural network 110.

After training, the location vector 104 that is provided as part of the network input can be selected randomly, as described below, or can be set to the perceptual center of the space of possible output images, as also described below. Moreover, after training, the super-resolution neural network 110 can be used to generate multiple different plausible higher-resolution versions of the same input image by providing multiple different network inputs that each include the same input image but different vectors 104, i.e., with the vector 104 in each network input being selected randomly.

During the training, the training engine 150 repeatedly trains the two neural networks 110 and 160 on mini-batches of training examples from the training data 152. Within a given mini-batch, the training engine 150 can generate a respective super-resolution parameter update and a respective critic parameter update for each training example. The training engine 150 can then combine, e.g., average or add, the super-resolution parameter updates for the training examples in the mini-batch and apply the combined super-resolution parameter update to the current values of the super-resolution parameters, e.g., by adding the combined update to the current values or subtracting the combined update from the current values. Similarly, the training engine 150 can then combine, e.g., average or add, the critic parameter updates for the training examples in the mini-batch and apply the combined critic parameter update to the current values of the critic parameters, e.g., by adding the combined update to the current values or subtracting the combined update from the current values.

By repeatedly performing this updating of the super-resolution parameters and the critic parameters across many mini-batches, the training engine 150 repeatedly updates the super-resolution parameters to determine the trained values of the super-resolution parameters.

Figure 2A:
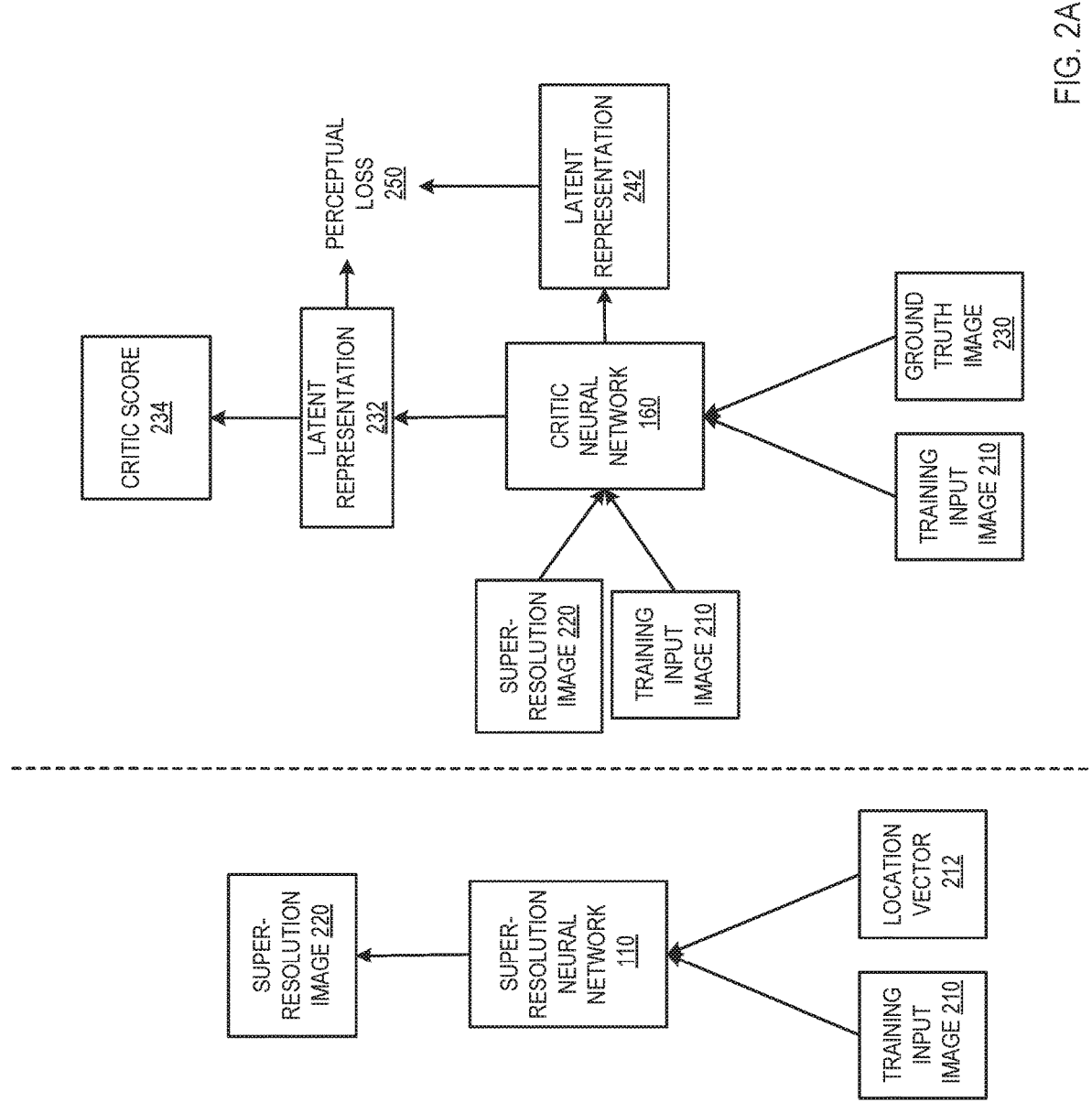
FIG. 2A illustrates the training of the super-resolution neural network and the critic neural network on a training example that includes a training input image and a ground-truth super resolution image.

FIG. 2A illustrates the training of the super-resolution neural network 110 and the critic neural network 160 on a training example that includes a training input image 210 and a ground-truth super resolution image 230. In particular, the system 100 uses the training example to compute an update to the current values of the super-resolution parameters and an update to the current values of the critic parameters.

Upon receiving the training example, the system processes a first training network input that includes the training input image 210 and a first location vector 212 using the super-resolution neural network 110 and in accordance with current values of the super-resolution parameters to generate a first training super-resolution output image 220.

The first location vector 212 identifies the perceptual center of the space of possible super-resolution images. In particular, the first location vector 212 represents a location of the ground truth super-resolution output image 230 in the space of possible super-resolution output images. That is, given that the ground truth super-resolution output image is a known super-resolution version of the input image, it can be assumed that the ground truth image lies at the center of the space of possible output images.

In some implementations, the first location vector 212 is a fixed vector that is designated as representing the perceptual center. For example, the first location vector 212 can be a vector of zeroes, i.e., a vector composed entirely of zero values.

In some other implementations, the first location vector 212 is an embedding of the ground-truth super-resolution output image 230. For example, the system can process the output image 230 using an embedding neural network, i.e., a pre-trained neural network or one that is being trained jointly with the neural networks 110 and 160, to generate the first location vector 212.

The system then processes a first critic input generated from (i) the training input image 210 and (ii) the ground truth super-resolution output image 230 using the critic neural network 160 in accordance with current values of the critic parameters to map the first critic input to a latent representation 232 of the first critic input in the perceptual latent space.

In implementations where the critic inputs use pixel-wise distances, the first critic input includes (i) the ground truth super-resolution output image 230 and (ii) a zero image having the first resolution, i.e., an image where all intensity values for all pixels are zero. The first resolution image is a zero image because the absolute pixel-wise distance between any given pixel in the first training image and the corresponding pixel in the downsampled version of the ground truth super-resolution output image 230 is zero given that the ground-truth image 230 is an actual super-resolution version of the training input image 210.

The system also processes a second critic input generated from (i) the training input image 210 and (ii) the first training super-resolution output image 220 generated by the super-resolution neural network 110 using the critic neural network 160 and in accordance with the current values of the critic parameters to map the second critic input to a latent representation 242 of the second critic input in the perceptual latent space. In implementations where the critic inputs use pixel-wise distances, the second critic input includes (i) the first training super-resolution output image 220 generated by the super-resolution neural network and (ii) an absolute pixel-wise distance between (iii) the training input image 210 and (iv) a downscaled version of the first training super-resolution image 220.

The system then computes a gradient with respect to the super-resolution parameters of a generator loss function that includes a perceptual loss 250 that measures a distance between the latent representation 232 of the first critic input and the latent representation 242 of the second critic input. For example, the perceptual loss 250 can be the squared difference between the latent representation 232 and the latent representation 242.

The system can then determine the update to the current values of the super-resolution parameters from the computed gradient.

By including the perceptual loss 250 in the generator loss function, the system trains the super-resolution neural network 110 to generate output images that result in the difference between the latent representations for the first and second critic inputs in the perceptual space being reduced. In particular, because the first location vector 212 represents the location of the ground-truth output image 230 in the perceptual space, reducing the difference between the latent representations results in the super-resolution neural network 110 generating output images that are accurately positioned in the perceptual space, i.e., that are perceptually similar to the ground-truth output image 230.

As described above, the critic neural network 160 also maps the first critic input to a first critic score 234.

The critic neural network 160 can also map the second critic input to a second critic score, but this second critic score is not used in the training and can be discarded or not generated.

Figure 2B:
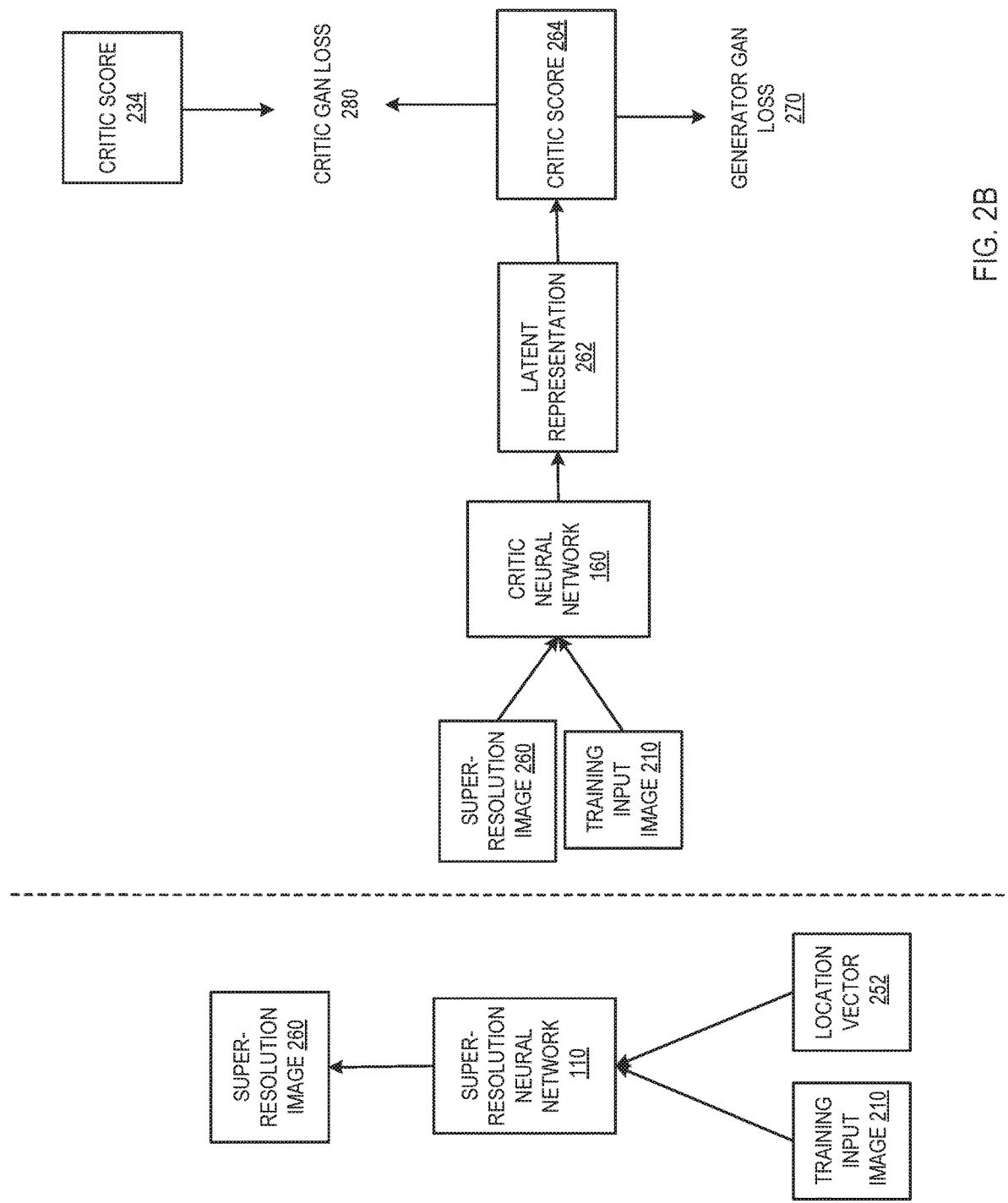
FIG. 2B further illustrates the training of the super-resolution neural network and the critic neural network on the training example that includes the training input image and the ground-truth super resolution image.

FIG. 2B further illustrates the training of the super-resolution neural network 110 and the critic neural network 160 on the training example that includes a training input image 210 and a ground-truth super resolution image 230.

As described above, the generator loss that is used to train the super-resolution neural network 110 includes a perceptual loss 250. The generator loss also includes another loss, a generator generative adversarial networks (GAN) loss 270, that encourages the super-resolution neural network 110 to generate output images that have increased perceptual similarity with the corresponding input images according to the critic scores generated by the critic neural network 160. For example, the generator loss can be a sum or a weighted sum of the perceptual loss 250 and the generator GAN loss 270.

FIG. 2B shows one example of computing the generator GAN loss 270. In particular, in the example of FIG. 2B, the system processes a second training network input that includes the training input image 210 using the super-resolution neural network 110 and in accordance with current values of the super-resolution parameters to generate a second training super-resolution output image 260.

The second training network input also includes a second location vector 252. Unlike the first location vector 212, the system samples each value in the second location vector 252 randomly from a pre-determined distribution, e.g., from a Normal distribution with mean zero and standard deviation one. Thus, the second location vector 252 represents a random output image in the space of possible super-resolution output images for the training input image 210. By randomly sampling the location vector 252, the system ensures that the neural network 110 learns to generate multiple different plausible images of the same input image.

The system then processes a third critic input generated from (i) the training input image 210 and (ii) the second training super-resolution output image 260 generated by the super-resolution neural network 110 using the critic neural network 160 and in accordance with the current values of the critic parameters to generate a latent representation 262 of the third critic input in the perceptual latent space and a third critic score 264 that represents a perceptual similarity between the training input image 210 and the second training super-resolution output image 260.

In implementations where the critic inputs use pixel-wise distances, the third critic input includes (i) the second training super-resolution output image 260 generated by the super-resolution neural network and (ii) an absolute pixel-wise distance between (iii) the training input image 210 and (iv) a downscaled version of the second training super-resolution image 260.

The system can then use this third critic score 264 to compute the generator GAN loss 270. For example, the generator GAN loss 270 can be equal to or directly proportional to the negative of the third critic score 264, i.e., the generator GAN loss 270 is smaller when the third critic score 264 is bigger. In other words, the generator GAN loss 270 encourages the super-resolution neural network 110 to generate output images that result in the critic neural network 160 predicting increased perceptual similarity between the generated output images and the corresponding training input images even when the values of the location vector are sampled randomly.

As described above, the system trains the super-resolution neural network 110 jointly with the critic neural network 160. Thus, the system also computes an update to the current values of the critic parameters using the training example.

In particular, the update to the current values of the critic parameters encourages the critic neural network 160 to indicate that the ground-truth output image 230 is perceptually similar to the training input image 210 but that output images generated by the super-resolution neural network 110 are not perceptually similar to the training input image 210, as reflected by the corresponding critic scores generated by the critic neural network 160.

By training the two neural networks jointly in this manner, the system ensures that the critic neural network 160 improves at distinguishing between ground-truth output images and output images generated by the super-resolution neural network 110, forcing the super-resolution neural network 110 to continue to improve at generating output images that are perceptually similar to the corresponding input images.

More specifically, the system trains the critic neural network 160 to minimize a critic GAN loss 280 that is based on the first critic score 234 and the third critic score 264 and encourages decreased perceptual similarity between the training input image 210 and the second training super-resolution output image 260 while encouraging increased perceptual similarity between the training input image 210 and the ground truth super-resolution output image 230.

Thus, to compute the update to the current values of the critic parameters, the system computes a gradient of the critic GAN loss 280 with respect to the critic parameters and determines an update to the current values of the critic parameters from the computed gradient.

As one example, the critic GAN loss 280 can be a Wasserstein GAN loss. In this case, the critic GAN loss 280 L can be equal to the third critic score 264 minus the first critic score 234 and plus a gradient penalty loss. The gradient penalty loss $\mathcal{L}_{\nabla}(C)$ penalizes the critic neural network 160 for generating critic scores that are not in the space of 1-Lipschitz functions and can be expressed as:

$$\mathcal{L}_{\nabla}(C) = (\|\nabla_x C(\hat{x}, x^{LR})\|_2 - 1\|)^2$$

where $\hat{x}$ is a super-resolution image that is a randomly weighted sum between the images 260 and 230, $x^{LR}$ is the training input image 210, and $C(\hat{x}, x^{LR})$ is the critic score generated by processing a critic input generated from the super-resolution image and the training input image 210.

Other GAN losses can be used to train the critic neural network 210 in place of the Wasserstein GAN loss. For example, the critic neural network 210 could instead be trained using a relativistic GAN loss.

Figure 3:
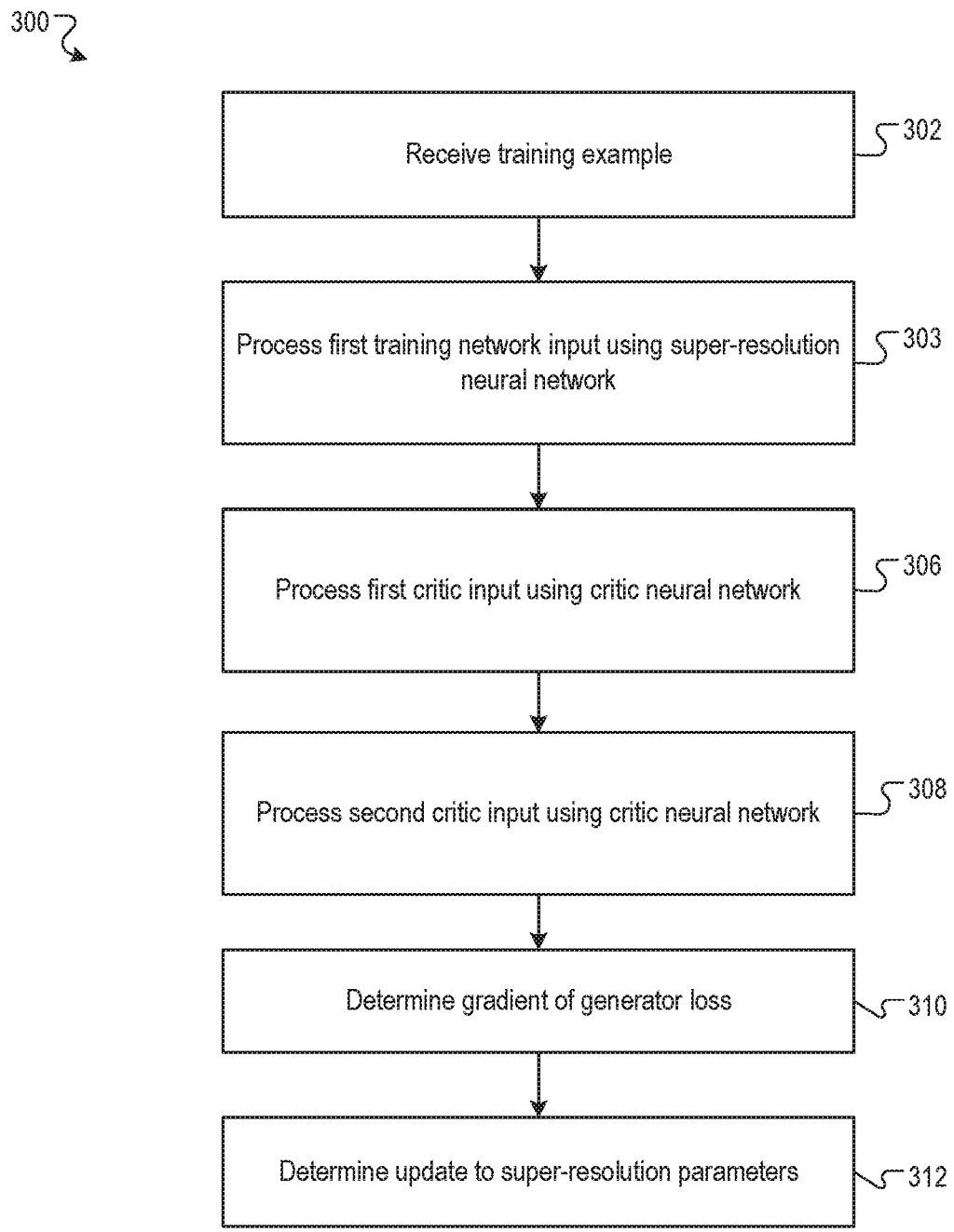
FIG. 3 is a flow diagram of an example process for determining an update to the super-resolution parameters.

FIG. 3 is a flow diagram of an example process 300 for determining an update to the super-resolution parameters. For convenience, the process 300 will be described as being performed by a system of one or more computers located in one or more locations. For example, a training system, e.g., the training system 100 of FIG. 1, appropriately programmed, can perform the process 300.

The system can perform the process 300 for each training example in a mini-batch of training examples to generate a respective super-resolution parameter update for each training example. The system can then combine, e.g., average or add, the updates for the training examples in the mini-batch and apply the combined update to the current values of the super-resolution parameters, e.g., by adding the combined update to the current values or subtracting the combined update from the current values.

By repeatedly performing this updating of the super-resolution parameters across many mini-batches, the system repeatedly updates the super-resolution parameters to determine the trained values of the parameters.

As described above, the system also trains the critic neural network jointly with the super-resolution neural network. In particular, the system also generates a respective critic parameter update for each training example in the mini-batch as described above with reference to FIG. 2B. The system can then combine, e.g., average or add, the critic parameter updates for the training examples in the mini-batch and apply the combined update to the current values of the critic parameters, e.g., by adding the combined update to the current values or subtracting the combined update from the current values.

By repeatedly performing this updating of the critic parameters across many mini-batches, the system repeatedly updates the critic parameters to determine the trained values of the parameters.

The system receives a training example (step 302) that includes a training input image and a ground truth super-resolution output image for the training image.

The system processes a first training network input that includes the training input image using the super-resolution neural network and in accordance with the current values of the super-resolution parameters to generate a first training super-resolution output image (step 304).

The system processes a first critic input generated from (i) the training input image and (ii) the ground truth super-resolution output image using the critic neural network and in accordance with current values of the critic parameters to map the first critic input to a latent representation of the first critic input in the perceptual latent space (step 306).

The system processes a second critic input generated from (i) the training input image and (ii) the first training super-resolution output image generated by the super-resolution neural network using the critic neural network and in accordance with the current values of the critic parameters to map the second critic input to a latent representation of the second critic input in the perceptual latent space (step 308).

The system determining a gradient with respect to the super-resolution parameters of a generator loss function that includes a perceptual loss that measures a distance between the latent representation of the first critic input and the latent representation of the second critic input (step 310). As described above, the generator loss function can also include a generator GAN loss.

The system determines, from the gradient, an update to the current values of the super-resolution parameters (step 312). The system can determine the update by applying an update rule to the gradient, e.g., a stochastic gradient descent update rule, an Adam optimizer update rule, an rmsProp update rule, or a learned update rule that is specific to the training of the super-resolution neural network. Similarly, the system can determine the update for the critic network parameters by applying an update rule to the gradient of the critic loss function.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a super-resolution neural network having a plurality of super-resolution parameters, wherein the super-resolution neural network is configured to receive a network input comprising an input image having a first resolution and to process the network input to generate a super-resolution output image that is a version of the input image with a second, higher resolution, wherein the network input includes a vector representing a desired location in a space of possible super-resolution output images, and the method comprising:

receiving a training input image and a ground truth super-resolution output image for the training image;

processing a first training network input comprising the training input image using the super-resolution neural network and in accordance with current values of the super-resolution parameters to generate a first training super-resolution output image, wherein the first training network input includes a first vector representing a location of the ground truth super-resolution output image in the space of possible super-resolution output images;

processing a first critic input generated from (i) the training input image and (ii) the ground truth super-resolution output image using a critic neural network having a plurality of critic parameters and in accordance with current values of the critic parameters, wherein the critic neural network is configured to receive the first critic input and to process the first critic input in accordance with the current values of the critic parameters to:
map the first critic input to a latent representation of the first critic input in a perceptual latent space;
processing a second critic input generated from (i) the training input image and (ii) the first training super-resolution output image generated by the super-resolution neural network using the critic neural network and in accordance with the current values of the critic parameters to map the second critic input to a latent representation of the second critic input in the perceptual latent space;
determining a gradient with respect to the super-resolution parameters of a generator loss function that includes a perceptual loss that measures a distance between the latent representation of the first critic input and the latent representation of the second critic input; and
determining, from the gradient, an update to the current values of the super-resolution parameters.

2. The method of claim 1, wherein the first network input includes a vector of zeroes.

3. The method of claim 1, wherein the first network input includes an embedding of the ground truth super-resolution output image.

4. The method of claim 3, wherein the embedding is generated from the ground truth super-resolution output image by an embedding neural network.

5. The method of claim 1, wherein the critic neural network is further configured to map each latent representation of each critic input to a critic score that represents a perceptual similarity between the images used to generate the critic input.

6. The method of claim 5, wherein processing the first critic input generated from (i) the training input image and (ii) the ground truth super-resolution output image using a critic neural network further comprises generating, from the latent representation of the first critic input, a first critic score that represents a perceptual similarity between the (i) the training input image and (ii) the ground truth super-resolution output image.

7. The method of claim 6, further comprising:
processing a second training network input comprising the training input image using the super-resolution neural network and in accordance with current values of the super-resolution parameters to generate a second training super-resolution output image; and
processing a third critic input generated from (i) the training input image and (ii) the second training super-resolution output image generated by the super-resolution neural network using the critic neural network and in accordance with the current values of the critic parameters to generate a latent representation of the third critic input in the perceptual latent space and a third critic score that represents a perceptual similarity between the training input image and the second training super-resolution output image;
wherein the generator loss function also includes a first Generative Adversarial Network (GAN) loss that encourages increased perceptual similarity between the training input image and the second training super-resolution output image.

8. The method of claim 7, wherein the second training network input comprises a random vector representing a random location in the space of possible super-resolution output images.

9. The method of claim 7, further comprising:
determining a gradient with respect to the critic parameters of a critic loss function that includes a second GAN loss to encourage decreased perceptual similarity between the training input image and the second training super-resolution output image while encouraging increased perceptual similarity between the training input image and the ground truth super-resolution output image; and
determining, from the gradient, an update to the current values of the critic parameters.

10. The method of claim 1, wherein each critic input includes a super-resolution image and an absolute pixel-wise distance between (i) a low-resolution image and (ii) a downscaled version of the super-resolution image.

11. The method of claim 10, wherein the first critic input includes (i) the ground truth super-resolution output image and (ii) a zero image, and wherein the second critic input includes (iii) the first training super-resolution output image generated by the super-resolution neural network and (iv) an absolute pixel-wise distance between (v) the training input image and (vi) a downscaled version of the first training super-resolution image.

12. A system comprising one or more computers and one or more storage devices storing instructions that when executed by the one or more computers cause the one or more computers to perform operations for training a super-resolution neural network having a plurality of super-resolution parameters, wherein the super-resolution neural network is configured to receive a network input comprising an input image having a first resolution and to process the network input to generate a super-resolution output image that is a version of the input image with a second, higher resolution, wherein the network input includes a vector representing a desired location in a space of possible super-resolution output images, and the operations comprising:
receiving a training input image and a ground truth super-resolution output image for the training image;
processing a first training network input comprising the training input image using the super-resolution neural network and in accordance with current values of the super-resolution parameters to generate a first training super-resolution output image, wherein the first training network input includes a first vector representing a location of the ground truth super-resolution output image in the space of possible super-resolution output images;
processing a first critic input generated from (i) the training input image and (ii) the ground truth super-resolution output image using a critic neural network having a plurality of critic parameters and in accordance with current values of the critic parameters, wherein the critic neural network is configured to receive the first critic input and to process the first critic input in accordance with the current values of the critic parameters to:
map the first critic input to a latent representation of the first critic input in a perceptual latent space;
processing a second critic input generated from (i) the training input image and (ii) the first training super-resolution output image generated by the super-resolution neural network using the critic neural network and in accordance with the current values of the critic parameters to map the second critic input to a latent representation of the second critic input in the perceptual latent space;

determining a gradient with respect to the super-resolution parameters of a generator loss function that includes a perceptual loss that measures a distance between the latent representation of the first critic input and the latent representation of the second critic input; and determining, from the gradient, an update to the current values of the super-resolution parameters.

13. The system of claim 12, wherein the first network input includes a vector of zeroes.

14. The system of claim 12, wherein the first network input includes an embedding of the ground truth super-resolution output image.

15. The system of claim 14, wherein the embedding is generated from the ground truth super-resolution output image by an embedding neural network.

16. The system of claim 12, wherein the critic neural network is further configured to map each latent representation of each critic input to a critic score that represents a perceptual similarity between the images used to generate the critic input.

17. The system of claim 12, wherein processing the first critic input generated from (i) the training input image and (ii) the ground truth super-resolution output image using a critic neural network further comprises generating, from the latent representation of the first critic input, a first critic score that represents a perceptual similarity between the (i) the training input image and (ii) the ground truth super-resolution output image.

18. One or more non-transitory computer-readable storage media storing instructions that when executed by one or more computers cause the one or more computers to perform operations for training a super-resolution neural network having a plurality of super-resolution parameters, wherein the super-resolution neural network is configured to receive a network input comprising an input image having a first resolution and to process the network input to generate a super-resolution output image that is a version of the input image with a second, higher resolution, wherein the network input includes a vector representing a desired location in a space of possible super-resolution output images, and the operations comprising:

receiving a training input image and a ground truth super-resolution output image for the training image;

processing a first training network input comprising the training input image using the super-resolution neural network and in accordance with current values of the super-resolution parameters to generate a first training super-resolution output image, wherein the first training network input includes a first vector representing a location of the ground truth super-resolution output image in the space of possible super-resolution output images;

processing a first critic input generated from (i) the training input image and (ii) the ground truth super-resolution output image using a critic neural network having a plurality of critic parameters and in accordance with current values of the critic parameters, wherein the critic neural network is configured to receive the first critic input and to process the first critic input in accordance with the current values of the critic parameters to:

map the first critic input to a latent representation of the first critic input in a perceptual latent space;

processing a second critic input generated from (i) the training input image and (ii) the first training super-resolution output image generated by the super-resolution neural network using the critic neural network and in accordance with the current values of the critic parameters to map the second critic input to a latent representation of the second critic input in the perceptual latent space;

determining a gradient with respect to the super-resolution parameters of a generator loss function that includes a perceptual loss that measures a distance between the latent representation of the first critic input and the latent representation of the second critic input; and determining, from the gradient, an update to the current values of the super-resolution parameters.

19. The system of claim 12, wherein processing the first critic input generated from (i) the training input image and (ii) the ground truth super-resolution output image using a critic neural network further comprises generating, from the latent representation of the first critic input, a first critic score that represents a perceptual similarity between the (i) the training input image and (ii) the ground truth super-resolution output image.

20. The system of claim 19, the operations further comprising:

processing a second training network input comprising the training input image using the super-resolution neural network and in accordance with current values of the super-resolution parameters to generate a second training super-resolution output image; and processing a third critic input generated from (i) the training input image and (ii) the second training super-resolution output image generated by the super-resolution neural network using the critic neural network and in accordance with the current values of the critic parameters to generate a latent representation of the third critic input in the perceptual latent space and a third critic score that represents a perceptual similarity between the training input image and the second training super-resolution output image;

wherein the generator loss function also includes a first Generative Adversarial Network (GAN) loss that encourages increased perceptual similarity between the training input image and the second training super-resolution output image.

* * * * *